M. S. BAZEMORE.
Rotary-Churn.

No. 208,705. Patented Oct. 8, 1878.

UNITED STATES PATENT OFFICE.

MERREDA S. BAZEMORE, OF SPRING GARDEN, ALABAMA.

IMPROVEMENT IN ROTARY CHURNS.

Specification forming part of Letters Patent No. 208,705, dated October 8, 1878; application filed August 16, 1878.

*To all whom it may concern:*

Be it known that I, MERREDA S. BAZEMORE, of Spring Garden, in the county of Cherokee and State of Alabama, have invented certain new and useful Improvements in Churns; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
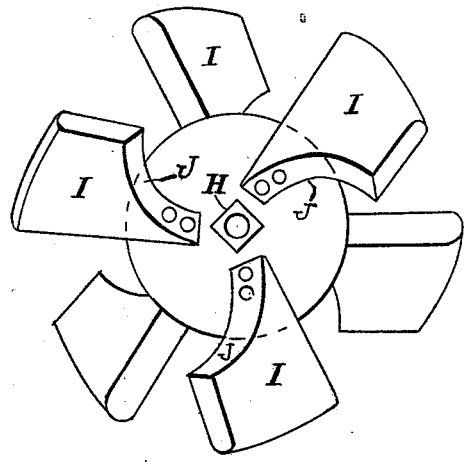
Figure 2:
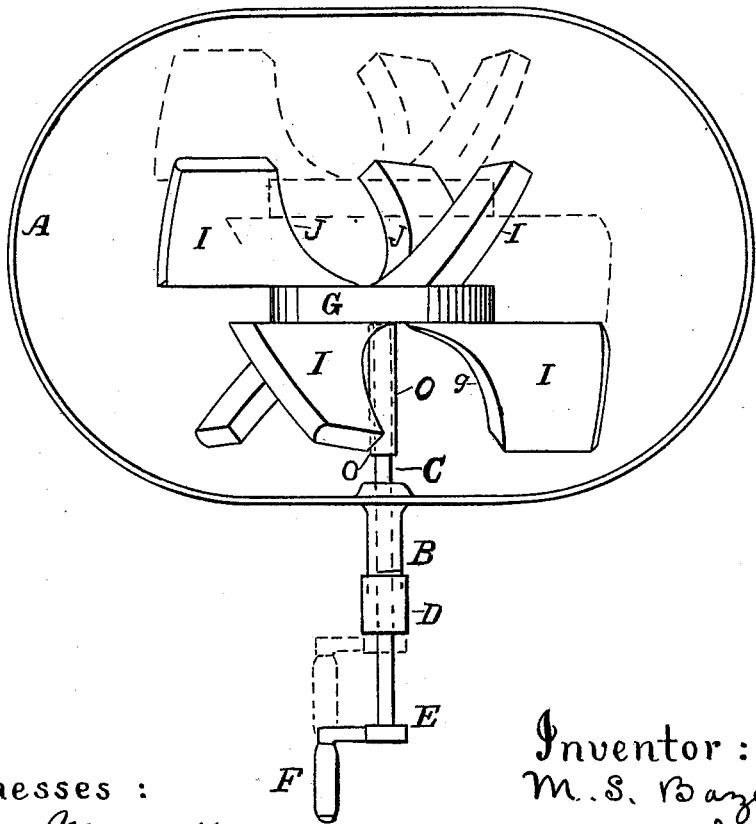

Figure 1 is a side elevation of the dasher removed from its shaft. Fig. 2 is a plan view of the churn, the lid thereof being removed.

This invention has relation to churns; and consists in the improvements in the construction of the same hereinafter more fully described, and pointed out in the claims.

The churn-body A is preferably made in the form of an ordinary wash-boiler, and one side thereof is provided with a sleeve, B, through which the shaft C is passed, a collar, D, regulating the distance to which it shall penetrate the churn-body.

The shaft C has a collar and a crank and handle, E F, and is provided on its inner side with screw-threads to permit the dasher to be screwed thereon. The threads run in a direction opposite to that in which the dasher is to be turned. The dasher consists of a circular block or disk, G, in the center of which a nut, H, is embedded to receive the threaded end of the shaft C to affix the dasher thereto.

Blades I are secured to both sides of the disk G alternately, so that those on one side come opposite the space between two on the other side. The edges of the blades that come in contact with the disk G are beveled, so that the blades I project outwardly from the disk at an angle of between fifteen and thirty degrees, (more or less,) and all on a side in the same direction, those on one side being the reverse of the others. The lower edges, J, of the blades are curved and beveled, as shown, and the upper edges are rounded. One side of the bevels, affixed to the disk G, presents cutting-edges against the cream, and the dasher in operation should be turned to drive these cutting-edges against the cream, and the blades will cut through the cream and agitate it effectually, thereby producing the butter in a very short space of time.

The shaft C is longitudinally adjustable within the sleeve B during the operation of churning, so that the dasher can be given a lateral as well as a rotary motion within the churn.

The dotted lines in Fig. 2 show the distance to which the shaft C can be moved laterally within sleeve B. The crank E limits it in one direction, and the loose sleeve O on the shaft C next the disk G limits it in the other direction and prevents the blades I from being either drawn or pushed against the sides of the churn during the lateral and rotary movements of the dasher. This construction permits the cream to be more thoroughly agitated.

The dasher and shaft may be removed at any time for the purpose of cleaning the churn by unscrewing the dasher from the shaft.

Having thus described my invention, what I claim as new and useful, and desire to secure by Letters Patent of the United States, is—

1. In a churn, the dasher composed of the disk G, in combination with the beveled and curved blades I secured to the opposite sides thereof, so as to alternate, substantially as and for the purpose set forth.

2. In a churn, the dasher G I upon the shaft C, provided with the crank E and sleeve O, and secured within the sleeve B, combined and operating to impart both a lateral and rotary motion to the dasher, as set forth.

In testimony that I claim the foregoing as my own I affix my signature in presence of two witnesses.

M. S. BAZEMORE.

Witnesses:
   W. A. T. HYATT,
   A. C. STEPHENS.